(12) United States Patent
Kim et al.

(10) Patent No.: US 11,988,888 B2
(45) Date of Patent: May 21, 2024

(54) LENS ACTUATOR

(71) Applicant: LG INNOTEK CO., LTD., Seoul (KR)

(72) Inventors: Kyung Won Kim, Seoul (KR); Hyun Ho Choi, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 930 days.

(21) Appl. No.: 16/975,652

(22) PCT Filed: Feb. 27, 2019

(86) PCT No.: PCT/KR2019/002362
§ 371 (c)(1),
(2) Date: Aug. 25, 2020

(87) PCT Pub. No.: WO2019/168342
PCT Pub. Date: Sep. 6, 2019

(65) Prior Publication Data
US 2020/0409015 A1    Dec. 31, 2020

(30) Foreign Application Priority Data

Feb. 28, 2018    (KR) .................. 10-2018-0024802

(51) Int. Cl.
*G02B 7/00* (2021.01)
*G03B 3/10* (2021.01)
(Continued)

(52) U.S. Cl.
CPC ............. *G02B 7/003* (2013.01); *G03B 3/10* (2013.01); *G03B 5/02* (2013.01); *G03B 17/12* (2013.01);
(Continued)

(58) Field of Classification Search
CPC .......... G02B 7/003; G03B 3/10; G03B 17/12; G03B 2205/0046; G03B 2205/0053;
(Continued)

(56) References Cited

U.S. PATENT DOCUMENTS 5,272,567 A * 12/1993 Inoue ................. G02B 7/10
359/698
6,456,444 B1   9/2002 Yumiki et al.
(Continued)

FOREIGN PATENT DOCUMENTS

CN    1294693 A    5/2001
CN    1979254 A    6/2007
(Continued)

OTHER PUBLICATIONS

International Search Report in International Application No. PCT/KR2019/002362, filed Feb. 27, 2019.
(Continued)

*Primary Examiner* — Marin Pichler
*Assistant Examiner* — Justin W. Hustoft
(74) *Attorney, Agent, or Firm* — Saliwanchik, Lloyd & Eisenschenk

(57) ABSTRACT

An embodiment relates to a lens actuator and a camera module including same. A lens actuator according to an embodiment may comprise: a base; a pin coupled to the base; a housing including a group of lenses to be moved along the pin in an optical axis direction; a magnet disposed on one side of the housing; a yoke spaced apart from the magnet; and a coil disposed between the magnet and the yoke. The housing may include a guide hole disposed at one side thereof and a guide groove disposed at the other side thereof. The pin may include a first pin disposed in the guide hole, and a second pin disposed in the guide groove. An attractive force may be applied between the yoke and the magnet.

17 Claims, 14 Drawing Sheets

(51) Int. Cl.
    *G03B 5/02* (2021.01)
    *G03B 17/12* (2021.01)
    *H04N 23/55* (2023.01)

(52) U.S. Cl.
    CPC ..... *H04N 23/55* (2023.01); *G03B 2205/0046* (2013.01); *G03B 2205/0053* (2013.01)

(58) Field of Classification Search
    CPC .. G03B 5/00; G03B 2205/0069; G03B 30/00; H04N 23/55
    USPC .......................................................... 359/642
    See application file for complete search history.

(56) References Cited

U.S. PATENT DOCUMENTS

| | | |
|---|---|---|
| 6,618,211 B2 | 9/2003 | Yumiki et al. |
| 7,350,990 B2 | 4/2008 | Shin et al. |
| 7,742,691 B2 | 6/2010 | Takahashi et al. |
| 10,768,437 B2 | 9/2020 | Park et al. |
| 2005/0146637 A1 | 7/2005 | Kawauchi |
| 2007/0053672 A1 | 3/2007 | Westerweck et al. |
| 2011/0091193 A1 | 4/2011 | Lim et al. |
| 2011/0236008 A1 | 9/2011 | Kang et al. |
| 2015/0177479 A1 | 6/2015 | Lee et al. |
| 2016/0377881 A1 | 12/2016 | Jung et al. |

FOREIGN PATENT DOCUMENTS

| | | |
|---|---|---|
| JP | 2633066 B2 | 7/1997 |
| JP | 2005-195845 A | 7/2005 |
| JP | 2006-189792 A | 7/2006 |
| JP | 5530498 B2 | 6/2014 |
| JP | 5786148 B2 | 9/2015 |
| KR | 10-2001-0034688 A | 4/2001 |
| KR | 10-2007-0041933 A | 4/2007 |
| KR | 10-2011-0042604 A | 4/2011 |
| KR | 10-2011-0106664 A | 9/2011 |
| KR | 10-2016-0022656 A | 3/2016 |
| KR | 10-1804779 B1 | 12/2017 |
| WO | WO-2015/102382 A1 | 7/2015 |
| WO | WO-2017/119760 A1 | 7/2017 |

OTHER PUBLICATIONS

Office Action dated Jul. 30, 2021 in Chinese Application No. 201980016168.2.
Office Action dated May 18, 2022 in Korean Application No. 10-2018-0024802.

\* cited by examiner

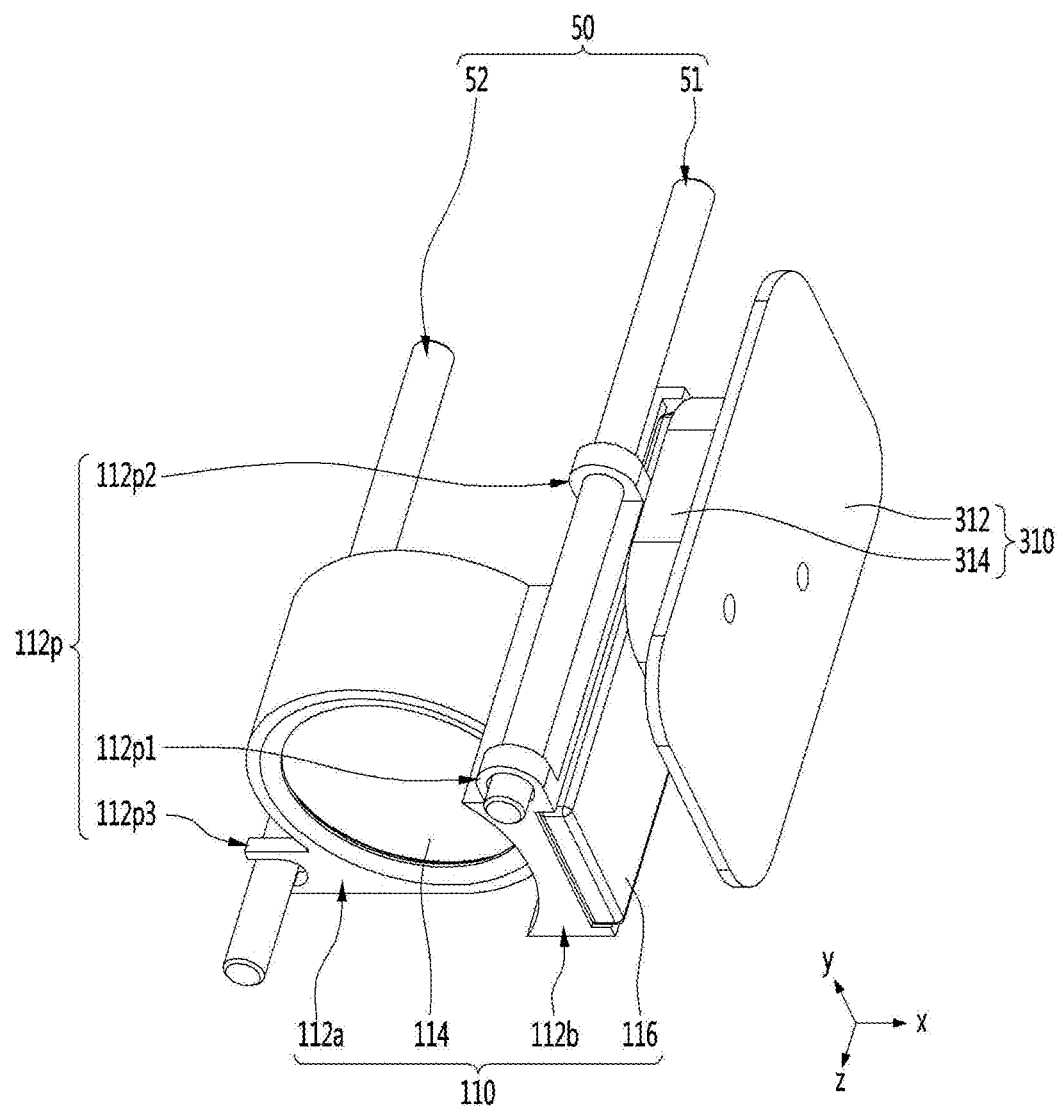

LENS ACTUATOR

CROSS-REFERENCE TO RELATED APPLICATIONS

This application is the U.S. national stage application of International Patent Application No. PCT/KR2019/002362, filed Feb. 27, 2019, which claims the benefit under 35 U.S.C. § 119 of Korean Application No. 10-2018-0024802, filed Feb. 28, 2018, the disclosures of each of which are incorporated herein by reference in their entirety.

TECHNICAL FIELD

The embodiment relates to a lens actuator and a camera module including the same.

BACKGROUND ART

The camera module performs a function of photographing a subject and storing it as an image or video, and is mounted on a mobile terminal such as a mobile phone, a laptop computer, a drone, or a vehicle.

On the other hand, portable devices such as smartphones, tablet PCs, and laptops have micro-camera modules built-in, and these camera modules automatically can adjust the distance between the image sensor and the lens to align the focal length of the lens with an autofocus function.

Recently, a camera module can perform a zooming function of zooming up or zooming out by increasing or decreasing the magnification of a distant subject with a zoom lens. There is an increasing demand for high magnification zooming of more than 2 times for camera modules.

On the other hand, a friction torque is generated when the lens moves by mechanical movement using a lens actuator for the zooming function in the camera module, and this friction torque reduces driving force such that technical problems occur such as increasing power consumption, or decreasing control characteristics.

In particular, in order to obtain the best optical characteristics in the camera module, the alignment between lenses must be well matched. However, when a decent in which the spherical center between the lenses deviates from the optical axis or a tilt, which is a lens inclination phenomenon, occurs, the angle of view changes or defocus occurs, which adversely affects image quality and resolution.

On the other hand, in the case of increasing the separation distance between moving objects when moving the lens for the zooming function in the camera module, friction torque resistance can be reduced. However, if the separation distance between objects is increased, there is a contradiction in the technical problem that lens decent or lens tilt occurs when zoom movement or zoom movement is reversed.

In addition, there is a technical problem in that it is difficult to implement the zooming function that is applied in a general large camera because there is a space limitation for zooming because the compact camera module has a size limitation.

For example, as the height of a mobile phone becomes slim, there is a limitation on the thickness of the lens.

On the other hand, the content described in this item merely provides background information on the embodiment and does not constitute the prior art.

DISCLOSURE

Technical Problem

One of the technical problems of the embodiment is to provide a lens actuator capable of inhibiting the occurrence of lens decenter or lens tilt when a lens is moved through zooming in the camera module, and a camera module including the same.

In addition, one of the technical problems of the embodiment is to provide a lens actuator capable of inhibiting occurrence of friction torque when the lens is moved through zooming in the camera module, and a camera module including the same.

In addition, one of the technical problems of the embodiment is to provide an actuator capable of smoothly performing a zooming function even in a very small and compact camera module, and a camera module including the same.

The technical problem of the embodiment is not limited to that described in this item, and includes what can be grasped from the entire description of the invention.

Technical Solution

The lens actuator according to the embodiment includes a base, a pin coupled to the base, a group of lenses, and a housing that is moved in an optical axis direction along the pin, a magnet disposed on one side of the housing, and a yoke spaced apart from the magnet, and a coil disposed between the magnet and the yoke.

The housing may include a guide hole on one side and a guide groove on the other side.

The pin may include a first pin disposed in the guide hole and a second pin disposed in the guide groove.

An attractive force may be applied between the yoke and the magnet.

A part of the first pin may be in contact with one side of the guide hole by the attractive force between the yoke and the magnet.

The one side of the guide hole in contact with the pin may be a region adjacent to the group of lenses.

The second pin may not contact a bottom surface of the guide groove.

The guide groove may be opened in a direction parallel to a direction in which the attractive force acts.

The guide groove may be opened in a direction perpendicular to the magnet facing the coil.

The height of the magnet may be lower than the height of the coil.

In addition, the length of the magnet may be greater than the length of the coil.

A side surface of the outer circumferential surface of the second pin may contact the sidewall of the guide groove.

The center of the group of lenses may be located on a line connecting the center of the first pin and the center of the second pin.

The guide hole and the guide groove may be disposed adjacent to the magnet.

The guide holes include two, and a distance between the two guide holes may be greater than a range of a moving distance of the group of lenses.

In addition, the lens actuator according to the embodiment includes a base, a pin coupled to the base, a housing including a group of lenses and moving in an optical axis direction along the pin, a magnet disposed on one side of the housing, and a yoke disposed to be spaced apart from the magnet and a coil disposed between the magnet and the yoke.

The housing may include a first guide groove on one side and a second guide groove on the other side.

The pin may include a first pin disposed in the first guide groove and a second pin disposed in the second guide groove.

An attractive force is applied between the yoke and the magnet.

The first guide groove and the second guide groove may include regions that are open in different directions.

The different directions may be perpendicular to each other.

In addition, the lens actuator according to the embodiment includes a first housing 112 including a first group of lenses 114 and moving along the pin 50, a first driving unit 310 including a first coil unit 314 and a first yoke 312 and spaced apart from one side of the first housing 112 and one or more protrusions 112p protruding toward one side of the first housing 112.

The pin 50 may be fitted into the protrusions 112p to guide the first lens assembly 110 to move parallel to the optical axis direction.

In addition, the lens actuator according to the embodiment includes at least two pins 50 disposed to be spaced apart from each other in parallel, and a first housing 112 including a first group of lenses 114 and moved along the pin 50, and a first driving part 310 spaced apart from one side of the first housing 112 including the first coil part 314 and the first yoke 312.

The pin 50 may include a first pin 51 and a second pin 52 disposed on the same side with respect to the first group of lenses 114.

The first housing 112 may include a first protrusion 112p1 and a fourth protrusion 112p4 disposed on the same side with respect to the first group of lenses 114.

The camera module of the embodiment may include a lens actuator and an image sensor unit disposed at one side of the lens actuator.

Advantageous Effects

The lens actuator and the camera module including the same according to the embodiment have a technical effect of solving a problem of occurrence of a lens decenter or tilt during zooming.

For example, according to the embodiment, by designing the camera module in consideration of the attractive force according to the magnetic force between the first magnet and the first yoke, point or line contact can be made between the first protrusion and the first pin in the x-axis direction. By controlling the assembly tolerance between the first protrusion and the first pin to be less than the limit level of the prior art, there is a technical effect that it is possible to minimize decenter or tilt of the lens during zooming by increasing the precision of lens alignment.

In addition, according to the embodiment, since the center of the lens unit can be inhibited from being distorted in the y-axis direction by the first guide groove of the third protruding portion, there is a technical effect of solving the problem of lens tilt during zooming.

Next, according to the embodiment, there is a technical effect capable of solving the problem of generating friction torque during zooming.

For example, according to the embodiment, by designing in consideration of the attractive force according to the magnetic force between the first magnet and the first yoke, the friction torque is made in point or line contact between the first protrusion and the first pin in the x-axis direction. By minimizing the friction torque, there are technical effects such as improvement of driving power, reduction of power consumption, and improvement of control characteristics.

In addition, according to an embodiment, by removing areas other than the first and second protrusions from the upper region of the first driving housing where the first pin is located, the weight of the first driving housing is reduced, thereby reducing frictional torque, thereby reducing frictional resistance. By reducing the weight, there are technical effects such as improvement in driving power during zooming, reduction in power consumption, and improvement in control characteristics.

Accordingly, according to the embodiment, there is a complex technical effect that can significantly improve image quality or resolution by inhibiting the occurrence of decent or tilt of the lens while minimizing friction torque during zooming.

Next, according to the embodiment, there is a technical effect that the zooming function can be smoothly performed even in a compact camera module.

For example, according to the embodiment, there is a technical effect that a compact camera module can be implemented by arranging the Hall sensor in the inner region of the first coil to reduce the region occupied by the Hall sensor.

The technical effects of the embodiments are not limited to those described in this item, and include those that can be grasped from the entire description of the invention.

DESCRIPTION OF DRAWINGS

FIG. 4A is a perspective view of a first lens assembly and a first driving unit in the camera module according to the embodiment shown in FIG. 3.

MODE FOR INVENTION

Hereinafter, exemplary embodiments will be described in detail with reference to the accompanying drawings.

On the other hand, in the description of the embodiment, in the case of being described as being formed in "top/bottom" or "up/below" of each element, "top/bottom" or "up/below" means two components Both of these components are in direct contact with each other, or in which one or more other components are formed indirectly between the two components.

In addition, when expressed as "top/bottom" or "up/below", it may include not only an upward direction but also a downward direction based on one configuration.

In addition, relational terms such as "top/upper portion/up" and "down/lower portion/below" used hereinafter may not require or imply any physical or logical relationship or order between such components or elements. It may be used to distinguish one component or element from another component or element.

In addition, in the description of the embodiment, terms such as "first" and "second" may be used to describe various elements, but these terms are used for the purpose of distinguishing one element from other elements.

In addition, terms specifically defined in consideration of the configuration and operation of the embodiments are only for describing the embodiments, and do not limit the scope of the embodiments.

EXAMPLE

Figure 1:
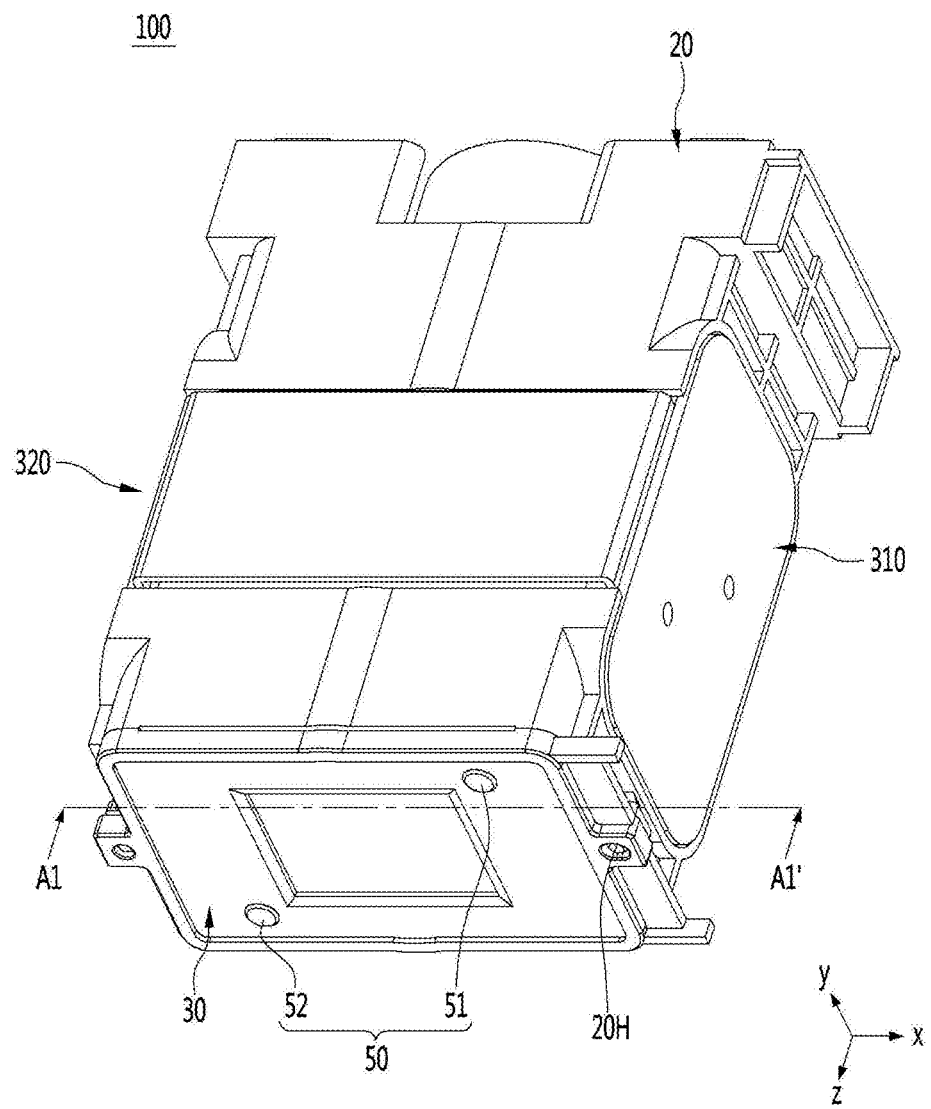
FIG. 1 is a perspective view of a camera module according to an embodiment.
Figure 2:
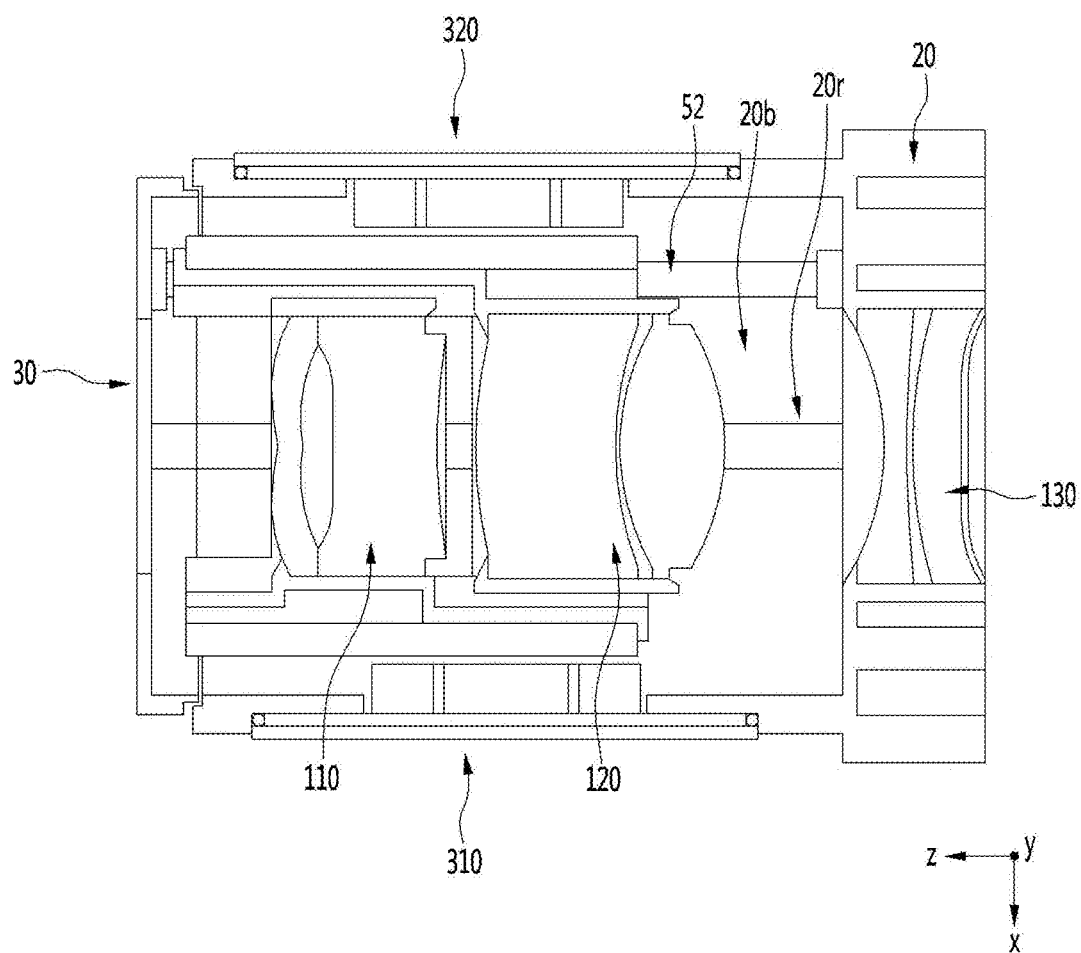
FIG. 2 is a cross-sectional view of a camera module according to the embodiment shown in FIG. 1.

FIG. 1 is a perspective view of a camera module 100 according to the embodiment, and FIG. 2 is a cross-sectional view taken along line A1-A1' of the camera module 100 according to the embodiment shown in FIG. 1.

In the xyz axis direction shown in FIGS. 1 and 2, the xz plane represents the ground, the z axis means the optical axis direction or a direction parallel thereto, and the x axis is a direction perpendicular to the z axis in the ground (xz plane). Means, and the y-axis may mean a direction perpendicular to the ground.

First, referring to FIG. 1, in the camera module 100 according to the embodiment, various optical systems are arranged on a predetermined base 20 (see FIG. 2), and one side of the base 20 is coupled to the lens cover 30.

A predetermined image sensor unit (not shown) may be disposed in the direction of the lens cover 30.

The material of the base 20 may be formed of at least one of plastic, glass-based epoxy, polycarbonate, metal, or composite material.

In the embodiment, the base 20 may be designed in a master barrel structure that surrounds the entire zoom module to inhibit foreign matter, block light, fix pins, and fix the lens, but is not limited thereto.

The lens cover 30 may be fitted with the base 20 in shape, or may be coupled by an adhesive. For example, a hook 20H may protrude from the side of the base 20, and the lens cover 30 has a hole formed at a position corresponding to the hook 20H. The hook 20H is mounted in the hole of the lens cover 30 so that the lens cover 30 and the base 20 may be coupled. In addition, the lens cover 30 may be stably coupled to the base 20 using an adhesive.

In addition, the lens cover 30 and the base 20 may be coupled to the pin 50. For example, the pin 50 may include a first pin 51 and a second pin 52 disposed to be spaced apart parallel to the optical axis. One side of the first pin 51 and the second pin 52 may be fixed by being coupled to the lens cover 30 and the other side with the base 20.

In an embodiment, the first driving unit 310 and the second driving unit 320 may be disposed on both sides of the base 20 on the ground in the direction of the x-axis perpendicular to the optical axis. In addition, a first circuit board (not shown) is disposed under the base 20 to be electrically connected to lens driving units inside the base 20.

Next, FIG. 2 is a cross-sectional view taken along line A1-A1' of the camera module 100 according to the embodiment shown in FIG. 1 in the z-axis direction, and in FIG. 2, the bottom surface 20b and the bottom groove 20r of the base are not cut surfaces, and other configurations are cut surfaces.

In the camera module 100 according to the embodiment, an optical system and a lens driver may be disposed on the base 20. For example, the camera module 100 according to the embodiment includes at least one or more of a first lens assembly 110, a second lens assembly 120, a third group of lenses 130, a first driving unit 310, the second driving unit 320 and the pin 50 (see FIG. 1) disposed on the base 20.

In an embodiment, a predetermined prism (not shown) may be disposed on the third group of lenses 130 side, and a predetermined image sensor unit (not shown) may be disposed on the lens cover 30 side.

According to an embodiment, a bottom groove 20r in which the first lens assembly 110 and the second lens assembly 120 move may be formed in the bottom surface 20b of the base 20 in the direction of the optical axis (z). The bottom groove 20r may have a downward concave shape according to the outer circumference shape of the lens, but is not limited thereto.

The first lens assembly 110, the second lens assembly 120, the third group of lenses 130, the prism, and the image sensor unit may be classified as optical systems.

In addition, the first driving unit 310, the second driving unit 320, the pin 50, etc. may be classified as a lens driving unit, and the first lens assembly 110 and the second lens assembly 120 also function as a lens driving unit. The first driving unit 310 and the second driving unit 320 may be driving units including a coil and a yoke, but are not limited thereto.

The pins 50 may perform a guide function of the lens assembly to be moved, and may be provided in singular or plural. For example, the pin 50 may include a first pin 51 and a second pin 52, but is not limited thereto. The pin 50 may be referred to as a rod or a shaft.

In an embodiment, the prism may change incident light into parallel light. For example, the prism changes the incident light into parallel light by changing the optical path of the incident light to an optical axis (z-axis) parallel to the central axis of the group of lenses. Thereafter, the parallel light passes through the third group of lenses 130, the second lens assembly 120, and the first lens assembly 110 and enters the image sensor unit to capture an image.

The prism may be an optical member having a triangular column shape. In addition, in the embodiment, a reflector or a reflective mirror may be used instead of or in addition to the prism.

In addition, in the embodiment, when the image sensor unit is not disposed in a direction perpendicular to the optical axis, an additional prism (not shown) may be provided so that light that has passed through the group of lenses is captured by the image sensor unit.

In an embodiment, the image sensor unit may be disposed perpendicular to the optical axis direction of parallel light. The image sensor unit may include a solid-state imaging device disposed on a predetermined second circuit board (not shown). For example, the image sensor unit may include a Charge Coupled Device (CCD) image sensor or a Complementary Metal-Oxide-Semiconductor (CMOS) image sensor.

Hereinafter, in the description of the embodiment, the case where there are two moving group of lenses is described, but is not limited thereto, and the number of moving group of lenses may be three, four, or five or more. In addition, the optical axis direction z may mean a direction identical to or parallel to the direction in which the group of lenses are aligned.

With continued reference to FIG. 2, the camera module according to the embodiment may perform a zooming function. For example, in the embodiment, the first lens assembly 110 and the second lens assembly 120 are moving lenses that move through the first driving unit 310, the second driving unit 320 and the pin 50, and the third group of lenses 130 may be a fixed lens.

For example, in an embodiment, the first lens assembly 110 and the second lens assembly 120 may be a moving group of lenses, and the third group of lenses 130 may be a fixed group of lenses.

In this case, the third group of lenses 130 may perform a function of a focator for imaging parallel light at a specific position.

Next, the second lens assembly 120 may perform a variable function of re-imaging an image formed by the third group of lenses 130 as a variator to another location. Meanwhile, in the second lens assembly 120, the magnification change may be large due to the large change in the distance or the image distance to the subject, and the second lens assembly 120 as the variator plays an important role in changing the focal length or magnification of the optical system.

On the other hand, the image point imaged in the second lens assembly 120 as the variator may be slightly different depending on the location.

Accordingly, the first lens assembly 110 may perform a position compensation function for an image imaged by the variator. For example, the first lens assembly 110 may perform a function of a compensator that performs a role of accurately imaging the image point by the second lens assembly 120 as the variator at the position of the actual image sensor unit.

Hereinafter, features of the camera module according to the embodiment will be described in detail with reference to FIGS. 3 to 9.

Figure 3:
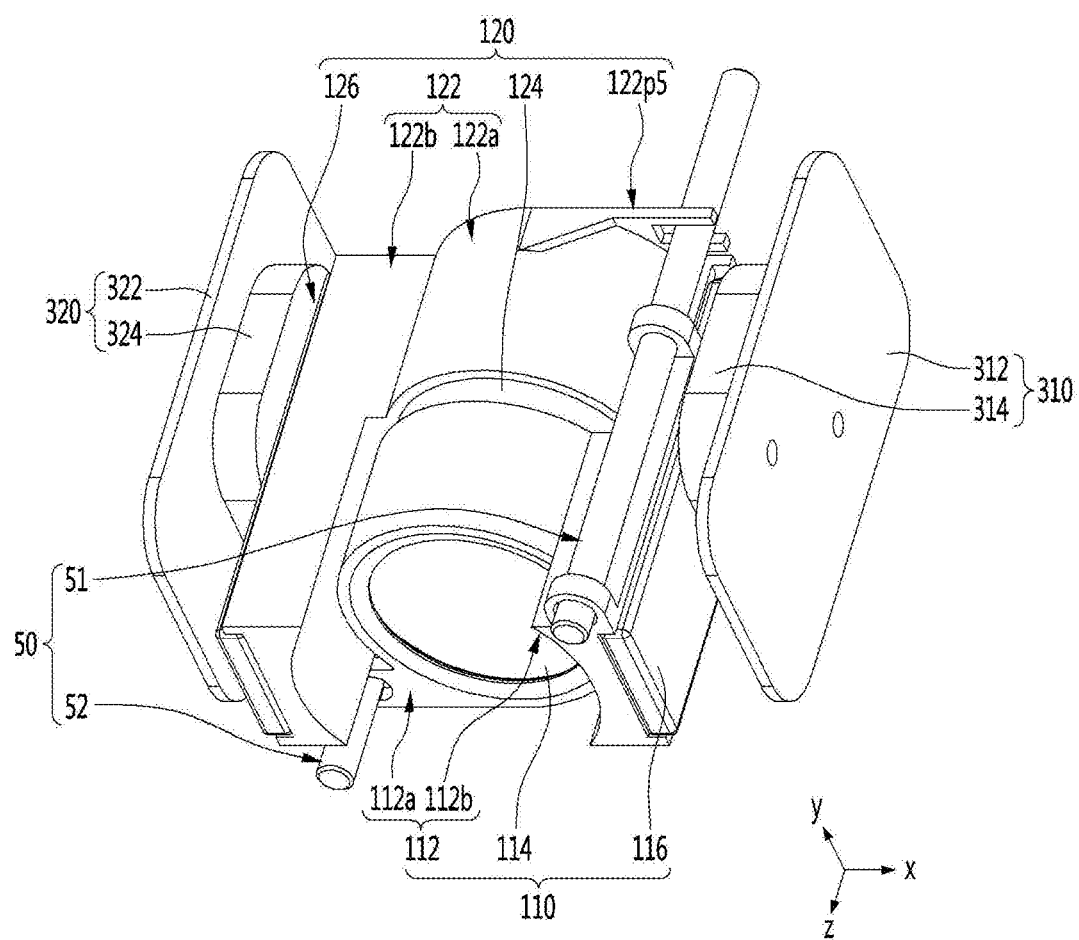
FIG. 3 is a perspective view of the camera module according to the embodiment shown in FIG. 1 with the base and the lens cover removed.

First, FIG. 3 is a perspective view in which the base 20 and the lens cover 30 are removed from the camera module according to the embodiment illustrated in FIG. 1.

In an embodiment, the lens actuator may include a mover and a fixing part. The mover is a concept corresponding to a fixed part and may be referred to as a moving part. For example, the mover may mean a lens assembly that is moved through a pin. On the other hand, the fixing unit may mean a base, a pin, a first driving unit, a second driving unit, and the like that are not moved.

FIG. 3, the camera module according to the embodiment may include an optical system such as a first lens assembly 110, a second lens assembly 120, a third group of lenses 130, an image sensor unit (not shown) on the base 20.

In addition, the camera module of the embodiment may include a lens driving unit such as the first driving unit 310, the second driving unit 320, and the pin 50. The first lens assembly 110 and the second lens assembly 120 may also perform a lens driving function.

First, in the embodiment, one or more pins 50 may be disposed parallel to the optical axis (z axis). For example, the pin 50 may include a first pin 51 and a second pin 52 spaced apart from each other in parallel with the optical axis direction. The first pin 51 and the second pin 52 are coupled to the base 20 and the lens cover 30 (refer to FIGS. 1 and 2) and may function as a movement guide of the first lens assembly 110 and a second lens assembly 120. The pin 50 may be formed of at least one of plastic, glass-based epoxy, polycarbonate, metal, or composite material.

Next, in the embodiment, the first lens assembly 110 and the second lens assembly 120 may be driven by electromagnetic force due to interaction with the first driving unit 310 and the second driving unit 320, respectively.

The first driving unit 310 and the second driving unit 320 may be driving units including a coil and a yoke. For example, the first driving unit 310 may include a first yoke 312 and a first coil unit 314, and the second driving unit 320 may include a second yoke 322 and a second coil unit 324.

The first lens assembly 110 of the embodiment may include at least one of the first housing 112, the first group of lenses 114, and the first magnet 116. The first housing 112 may include a first lens housing 112a accommodating the first group of lenses 114 and a first driving unit housing 112b accommodating the first magnet 116.

In addition, the second lens assembly 120 of the embodiment may include one or more of the second housing 122, the second group of lenses 124, and the second magnet 126. The second housing 122 may include a second lens housing 122a accommodating the second group of lenses 124 and a second driving unit housing 122b accommodating the second magnet 126. In addition, the second lens housing 122a may include a fifth protrusion 122p5 fitted to the first pin 51.

Hereinafter, the first lens assembly 110 will be described with reference to FIG. 4A.

Figure 4B:
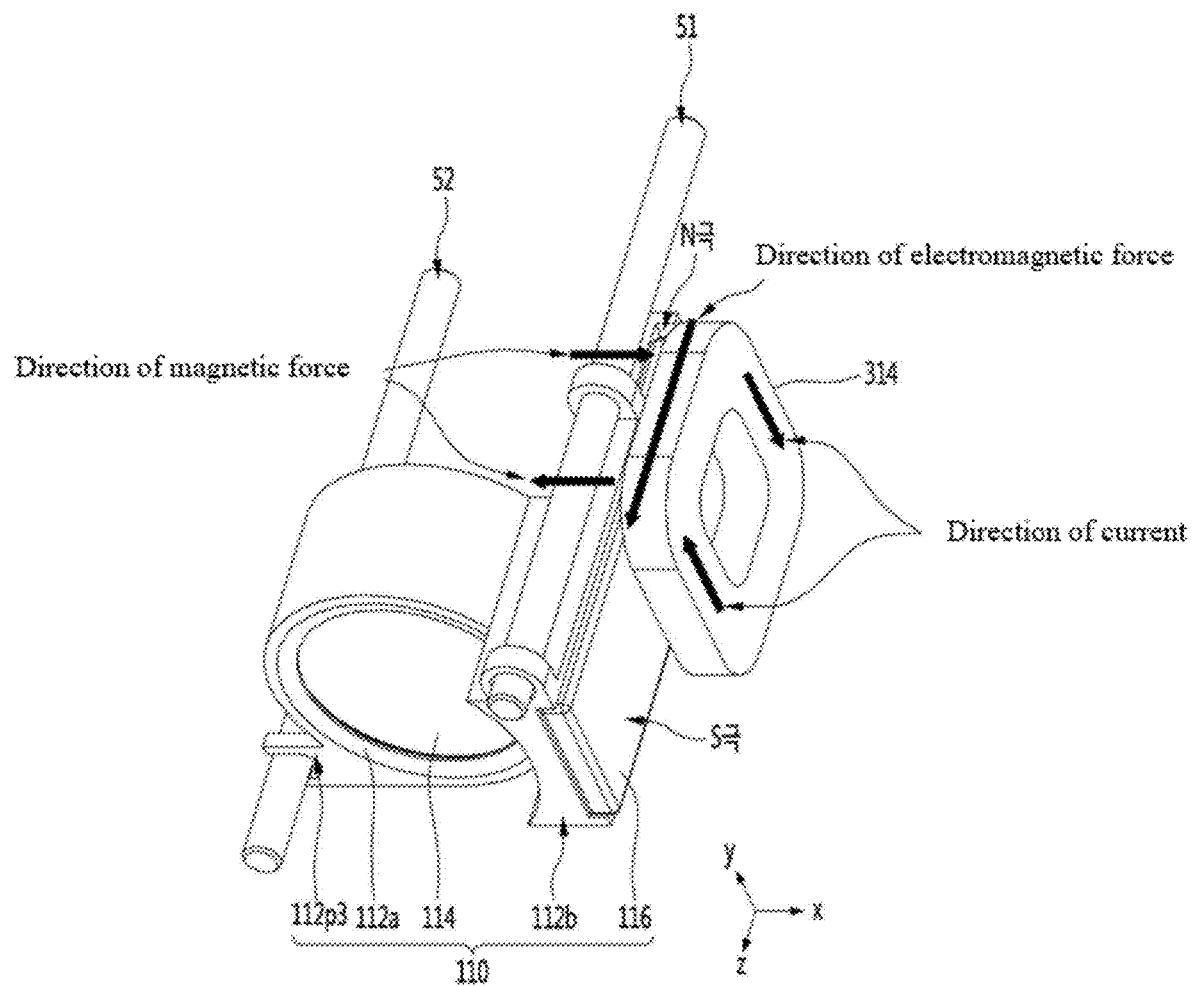
FIG. 4B is a diagram illustrating an example of interaction between a first magnet and a first coil unit in the camera module according to the embodiment shown in FIG. 4A.

FIG. 4A is a perspective view of a first lens assembly 110 and a first driving unit 310 in the camera module according to the embodiment shown in FIG. 3, and FIG. 4B is an example of interaction between the magnet 116 and the first coil unit 314 in the camera module according to the embodiment shown in FIG. 4A.

Referring to FIG. 4A, the first housing 112 of the first lens assembly 110 may include a first lens housing 112a and a first driving unit housing 112b. The first lens housing 112a functions as a barrel or a body tube, and a first group of lenses 114 may be mounted. The first group of lenses 114 may be a moving group of lenses, and may include a single lens or a plurality of lenses. The second housing 122 of the second lens assembly 120 may also include a second lens housing 122a and a second driving unit housing 122b.

Next, a first magnet 116 may be disposed on the first driving part housing 112b of the first lens assembly 110.

The first magnet 116 of the first lens assembly 110 may be a magnet driving unit, but is not limited thereto. For example, the first magnet 116 may include a first magnet that is a permanent magnet. Also, the second driving unit 126 of the second lens assembly 120 may be a magnet driving unit, but is not limited thereto.

With reference to FIG. 4B for a moment, an interaction in which an electromagnetic force is generated between the first magnet 116 and the first coil unit 314 in the camera module according to the embodiment will be described.

As shown in FIG. 4B, in the camera module according to the embodiment, the magnetization method of the first magnet 116 may be a vertical magnetization method. For example, in the embodiment, both the N and S poles of the first magnet 116 may be magnetized to face the first coil unit 314. Accordingly, the N-pole and S-pole of the first magnet 116 may be disposed to correspond to a region in which the current flows in the y-axis direction perpendicular to the ground in the first coil unit 314.

Referring to FIG. 4B, according to Fleming's left-hand rule, when magnetic force is applied in the x-axis direction from the N pole of the first magnet 116 in the embodiment, and a current flows in the direction opposite the y-axis from the first coil unit 314 such that the electromagnetic force acts in a direction parallel to the z-axis direction.

In addition, in the embodiment, when a magnetic force is applied in a direction opposite to the x-axis from the S pole of the first magnet 126, and a current flows in the y-axis direction perpendicular to the ground, z so that the electromagnetic force acts in the axial direction according to Fleming's left-hand rule.

At this time, since the first driving unit 310 including the first coil unit 314 is in a fixed state, the first lens assembly 110, which is a mover in which the first magnet 116 is disposed, can be moved parallel to the direction opposite to the z-axis. The electromagnetic force may be controlled in proportion to the current applied to the first coil unit 314.

Similarly, electromagnetic force between the second magnet 126 and the second coil unit 324 is generated in the camera module according to the embodiment, so that the second lens assembly 120 may be moved parallel to the optical axis.

Referring back to FIG. 4A, in an embodiment, the first driving unit housing 112b may guide the movement of the first lens assembly 110 in the optical axis direction by having one or more protrusions 112p.

For example, the first driving part housing 112b includes a first protrusion 112p1 protruding upward, and a first guide hole hl (refer to FIG. 6A) may be disposed in the first protrusion 112p1.

In addition, the first driving part housing 112b may further include a second protrusion 112p2 protruding upward and spaced apart from the first protrusion 112p1. A first guide hole hl may be disposed in the second protrusion 112p2.

Accordingly, in the embodiment, the protrusion 112p may include the first protrusion 112p1 and the second protrusion 112p2.

According to the embodiment, the first pin 51 is inserted into the first protrusion 112p1 and the second protrusion 112p2, so that the first lens assembly 110 may be precisely guided parallel to the optical axis direction.

According to this, according to the embodiment, the first protrusion 112p1 and the second protrusion 112p2 of the first housing 112 contact the first pin 51 to minimize the contact area to each other to inhibit frictional resistance. Accordingly, according to the embodiment, there is a technical effect such as improvement of driving force and reduction of power consumption by inhibiting occurrence of friction torque during zooming.

In addition, according to the embodiment, by reducing the weight of the first driving unit housing 112b, friction torque can be reduced, thereby improving driving force during zooming, reducing power consumption, and improving control characteristics.

For example, according to the embodiment, by removing the regions other than the first and second protrusions 112p1 and 112p2 from the upper region of the first driving unit housing 112b where the first pin 51 is located, thereby reducing the weight of the driving unit housing 112b, there is a technical effect such as reducing frictional resistance, improving driving force during zooming, reducing power consumption, and improving control characteristics.

With continued reference to FIG. 4A, the first lens housing 112a includes one or more protrusions 112p protruding to the side, thereby guiding the movement of the first lens assembly 110 in the optical axis direction, and inhibiting the lens from tilting toward the side at the same time, such that it is possible to inhibit the center axis from being twisted.

For example, the first lens housing 112a includes a third protrusion 112p3 protruding to the side, and a first guide groove r1 (refer to FIG. 5) is formed in the third protrusion 112p3.

According to the embodiment, the second pin 52 is inserted into the first guide groove r1 of the third protrusion 112p3, so that the first lens assembly 110 can be precisely guided parallel to the optical axis direction.

Accordingly, according to an exemplary embodiment, by supporting the second pin 52 from the third protrusions 112p3 of the first lens housing 112a, tilting of the lens portion upward and downward may be inhibited, thereby inhibiting the central axis from being twisted.

In addition, according to the embodiment, by contacting the second pin 52 from the third protrusion 112p3 of the first lens housing 112a, the frictional area is minimized to inhibit frictional resistance, thereby improving and consumption of driving force during zooming. There are technical effects such as reduction of power and improvement of control characteristics.

In addition, according to the embodiment, the friction torque can be reduced by reducing the weight of the first lens housing 112a, thereby improving driving force during zooming, reducing power consumption, and improving control characteristics.

For example, according to the embodiment, the weight of the first lens housing 112a can be reduced by removing an area other than the third protrusion 112p3 from the side area of the first lens housing 112a where the second pin 52 is located, thereby reducing the friction torque by reducing it, there are technical effects such as improvement of driving force during zooming, reduction of power consumption, and improvement of control characteristics.

Figure 5:
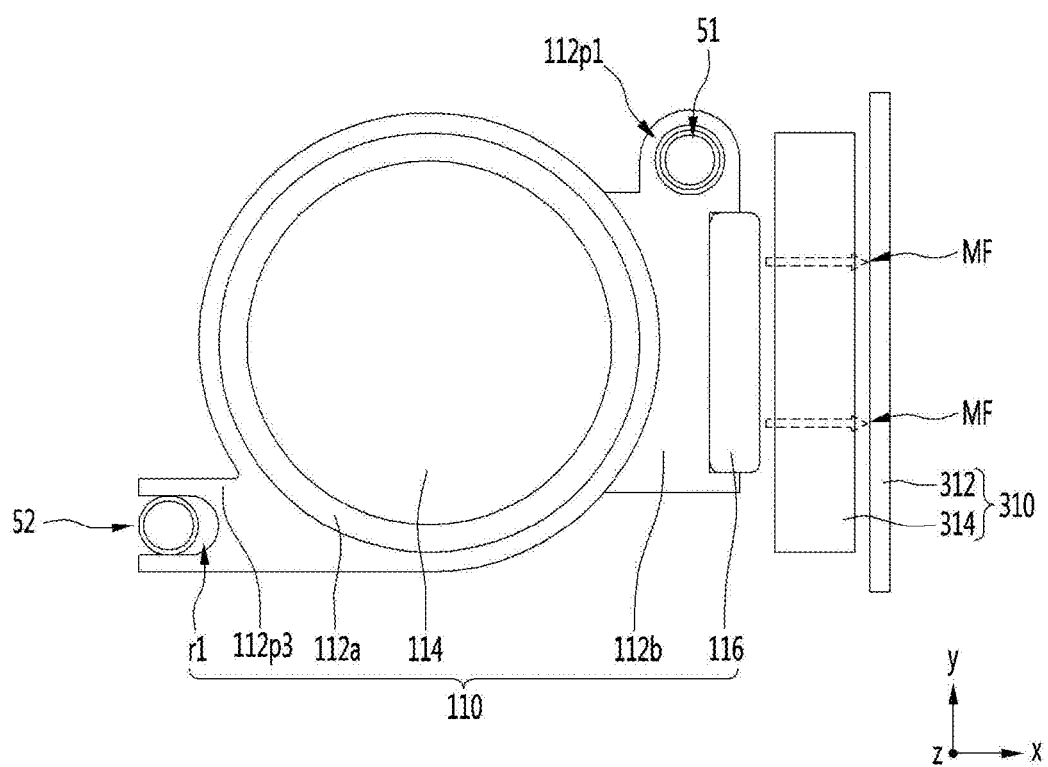
FIG. 5 is a front view of the first lens assembly and the first driving unit shown in FIG. 4A.
Figure 6A:
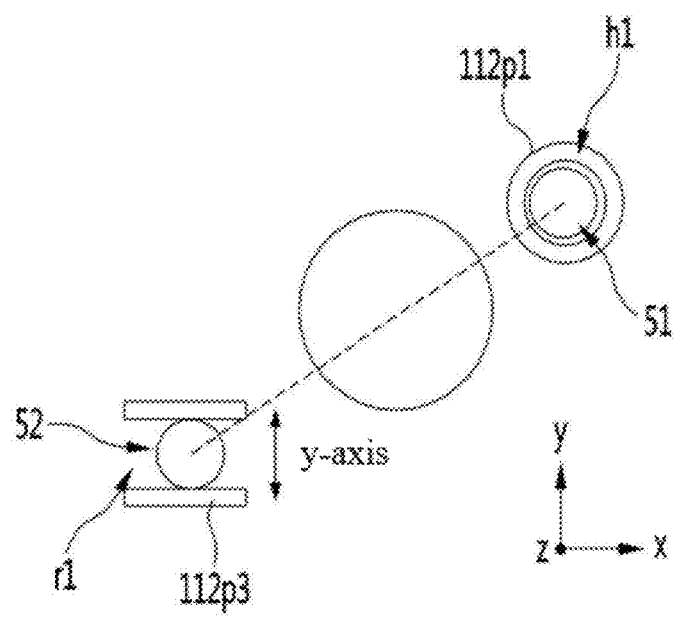
FIGS. 6A and 6B are conceptual views of driving a first lens assembly and a first driving unit illustrated in FIG. 5.
Figure 6B:
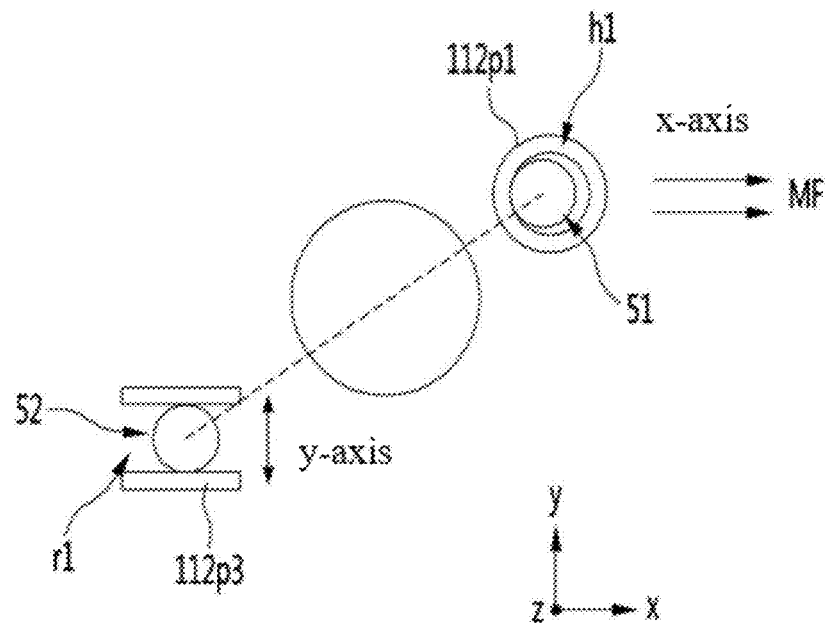

Next, FIG. 5 is a front view of the first lens assembly 110 and the first driving unit 310 shown in FIG. 4A in the z-axis direction, and FIGS. 6A and 6B are driving concept by the first lens assembly 110 and the first driving unit 310 shown in FIG. 5.

FIG. 5, in addition to the electromagnetic force between the first magnet 116 and the first coil unit 314, magnetic force is generated between the first magnet 116 and the first yoke 312, so that Magnetic force (MF) is applied to the first lens assembly 110 in the x-axis direction.

For example, FIG. 6A is a state diagram before the magnetic force is applied between the first magnet 116 and the first yoke 312.

Meanwhile, FIG. 6B is a diagram illustrating a state after magnetic force is applied between the first magnet 116 and the first yoke 312.

FIG. 6B, a magnetic force MF is applied between the first magnet 116 and the first yoke 312 so that the first lens assembly 110 may be moved a predetermined distance in the x-axis direction. Through this, a side surface of the outer circumferential surface of the first pin 51 may contact the sidewall of the first guide hole hl.

In general, a lens actuator has a predetermined assembly tolerance to reduce friction between the guide hole and the pin.

On the other hand, according to the embodiment, as shown in FIG. 6B, the first protrusion 112p1 and the first pin 51 are designed by designing the lens in consideration of the attractive force according to the magnetic force between the first magnet 116 and the first yoke 312, thereby making point contact or line contact between them, the precision of lens alignment can be remarkably improved.

For example, according to an unpublished study of the inventor of this application, the assembly tolerance between the first protrusion 112p1 and the first pin 51 is about 50 µm.

By the way, this is through the internal research of the inventor of the application, by designing the lens in consideration of the attraction of the magnetic force between the first magnet 116 and the first yoke 312, the outer circumferential surface of the first pin 51 can contact with the sidewall of the guide hole hl. Accordingly, by making point contact or line contact between the first protrusion part 112p1 and the first pin 51, the assembly tolerance is controlled to within about 10 µm, thereby increasing the precision of lens alignment and there is a technical effect that decentering can be minimized when zooming.

In addition, when the first yoke 312 and the first magnet 116 are pulled in the first direction (for example, the x-axis direction) due to the interaction of the electromagnetic force, the protruding direction or the groove direction of the third protrusions 112p3 can be formed in a direction parallel to the first direction substantially the same as the direction pulled by the interaction (for example, the x-axis direction), so that tolerance and driving errors of the assembly may be reduced.

The embodiment may be designed in consideration of the attractive force according to the magnetic force between the first magnet 116 and the first yoke 312. Through this, point contact or line contact is made between the first protrusion part 112p1 and the first pin 51 in the x-axis direction, and the friction torque between the first protrusion part 112p1 and the first pin 51 is minimized. Accordingly, there are technical effects such as improvement in driving power, reduction in power consumption, and improvement in control characteristics.

According to the embodiment, it is possible to inhibit the lens unit from being distorted in the y-axis direction by the first guide groove r1 of the third protrusion part 112p3. Through this, according to the embodiment, there is a technical effect of solving the problem of the occurrence of lens tilt during zooming.

Accordingly, according to the embodiment, there is a complex technical effect that can significantly improve image quality or resolution by inhibiting the occurrence of decent or tilt of the lens while minimizing friction torque during zooming.

In addition, according to the embodiment, as the height of the magnet is smaller than the height of the coil, the size of the housing in which the magnet is mounted can be made compact, and the magnetic force between the magnet and the coil can be utilized to the maximum. For example, it is possible to drive the housing by the electromagnetic force between the magnet and the current in the coil region wound perpendicular to the optical axis direction.

In addition, the length of the magnet may be greater than the length of the coil, and through this, the position of the lens unit in the stroke range of the lens unit can be more accurately sensed.

Figure 7:
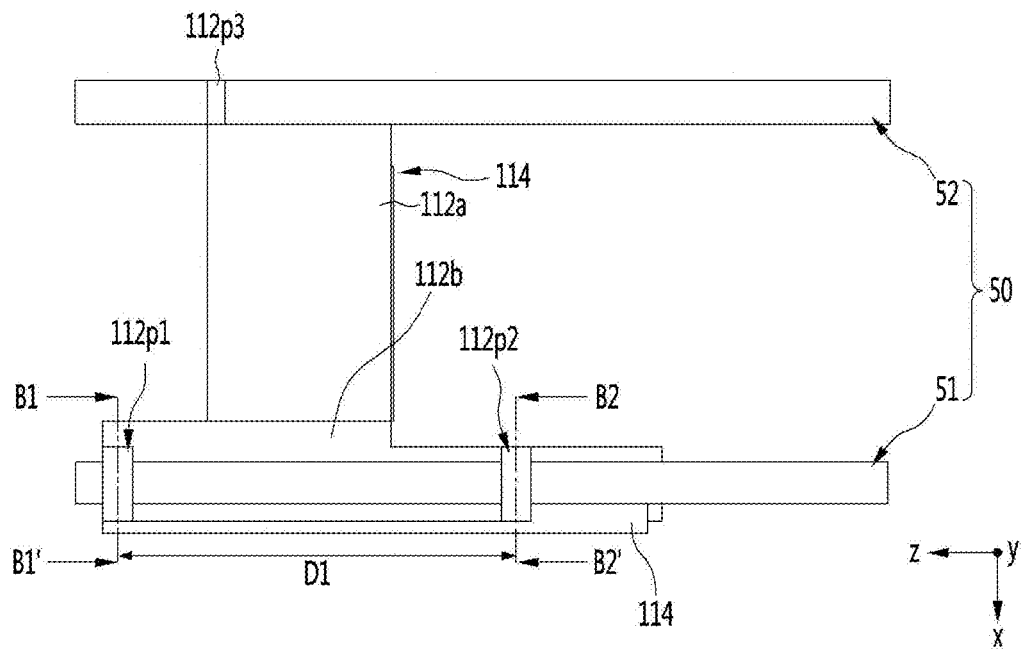
FIG. 7 is a plan view of the first lens assembly and pins shown in FIG. 4A.

Next, FIG. 7 is a plan view of the first lens assembly 110 and the pin 50 of FIG. 4A.

Figure 8A:
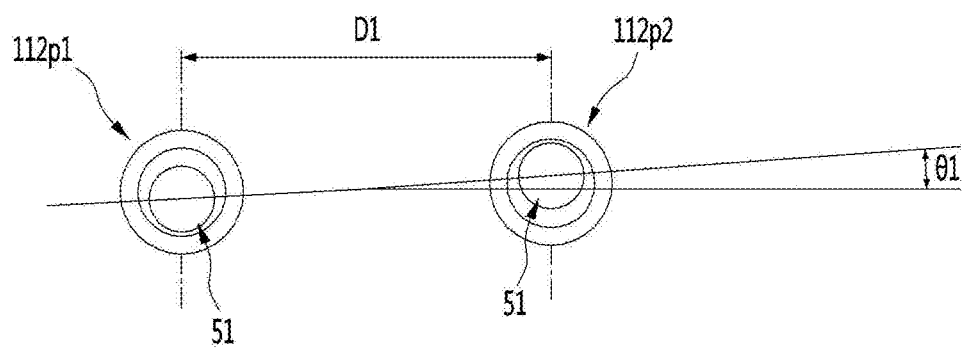
FIGS. 8A and 8B are conceptual views illustrating the operation of the camera driving apparatus shown in FIG. 7.
Figure 8B:
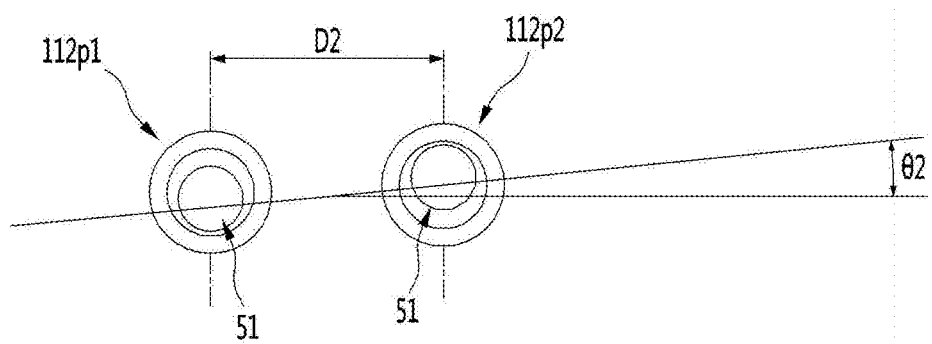

FIG. 8A is a conceptual diagram of the operation of the camera driving apparatus shown in FIG. 7, and FIG. 8B is a comparative example.

Specifically, FIG. 8A is a cross-sectional view of the first protrusion 112p1 and the second protrusion 112p2 in the first lens assembly 110 illustrated in FIG. 7 along lines B1-B1' and B2-B2', respectively. This is a conceptual diagram arranged in consideration of the first distance D1 between the first protrusion part 112p1 and the second protrusion part 112p2.

In the lens actuator according to the embodiment, the assembly tolerance between the pin and the guide hole and the distance between the first protrusion 112p1 and the second protrusion 112p2 must be considered in consideration of the optical performance of the lens.

At this time, the distance between the protrusions may be determined as follows.

$$\text{Moving Tilt (Tan } \Theta = \text{assembly tolerance/(distance between protrusions/2)} \tag{1}$$

$$\text{Distance between protrusions} = (\text{Assembly Tolerance/Moving Tilt}) \times 2 \tag{2}$$

Therefore, the longer the distance between the protrusions, the less distortion during the operation of the lens, and in the embodiment, the first distance D1 between the first protrusion 112p1 and the second protrusion 112p2 is secured to a wider range of the lens, thereby reducing the tilting, the accuracy of lens alignment can be improved.

For example, if the margin of the moving tilt (Θ) of the lens is within 1°, suppose that the assembly tolerance between the protrusions 112p1 and 112p2 and the first pin 51 is about 50 µm. The first distance D1 between the first protrusion 112p1 and the second protrusion 112p2 may be secured to be at least 5.7 mm.

Further, in the embodiment, the first distance D1 between the protrusions may be set larger than the stroke to inhibit distortion.

For example, when the stroke of the first lens assembly 110 is about 4 mm, the first distance D1 between the first protrusion part 112p1 and the second protrusion part 112p2 is about 5 mm or more, for example thereby securing more than 5.7 mm, tilt of the lens can be inhibited.

On the other hand, as shown in FIG. 8B, which is a comparative example, when the distance between the first protrusion part 112p1 and the second protrusion part 112p2 is kept short as the second distance D2, the inclination angle Θ2 of the lens part increases, and Tan Θ2 (Moving Tilt value) increases, there is a problem that the design margin of the moving tilt is exceeded.

Referring back to FIG. 3, in the embodiment, the number of protrusions of the second lens assembly 120 fitted into the pin 50 can be controlled less compared to the number of protrusions of the first lens assembly 110 fitted into the pin 50. Through this, there is a technical effect of inhibiting inclination of the lens by securing a wide distance between the protrusions of the first lens assembly 110.

For example, as shown in FIG. 3, in the embodiment, the protrusion of the second lens assembly 120 that is fitted to the first pin 51 may be one of the fifth protrusion 122p5. On the other hand, the protrusions of the first lens assembly 110 fitted into the first pin 51 may be a first protrusion 122p1 and a second protrusion 122p2.

According to the embodiment, a wide space between the first protruding portion 122p1 and the second protruding portion 122p2 can be secured. Through this, there is a special technical effect of inhibiting tilting of the lens by securing a wide distance between the first and second protrusions 122p1 and 122p2 of the first lens assembly 110.

Figure 9:
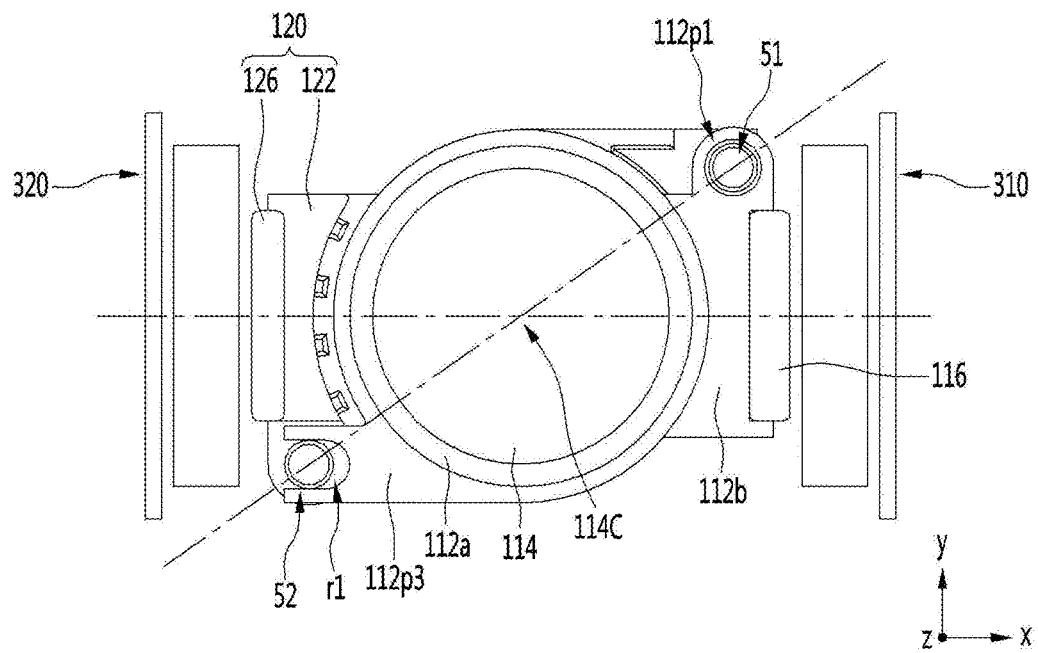
FIG. 9 is a front view of the camera driving apparatus according to the embodiment shown in FIG. 2.

Next, FIG. 9 is a front view of the camera driving apparatus according to the embodiment shown in FIG. 2.

In the camera driving apparatus according to the embodiment, the center 114C of the first group of lenses may be located on a line connecting the center of the first pin 51 and the center of the second pin 52. In a state in which the lens group is pulled to one side by magnetic force as shown in FIG. 6B, in the embodiment, a center 114C of the first lens group may be located on a line connecting a center of the first guide hole hl of the first protrusion 112p1 and a center of the first guide groove r1 of the protrusion 112p3.

Further, in the camera driving apparatus according to the embodiment, the center 114C of the first group of lenses may be located on a line connecting the first guide hole hl formed in the first protrusion part 112p1 and the center of the first guide groove r1 formed the third protrusion part 112p3. In a state in which the lens group is pulled to one side by magnetic force as shown in FIG. 6B, the center 114C of the first group of lenses may be located on a line connecting the first guide hole hl formed in the first protrusion part 112p1 and the center of the first guide groove r1 formed the third protrusion part 112p3.

According to the embodiment, the center 114C of the first lens group, the center of the first guide hole hl, and the center of the first guide groove r1 can be arranged on the same line, thereby facilitating optical axis alignment. In addition, there is a technical effect that can reduce lens decenter or tilt.

In particular, similar to the principle of FIG. 8A, according to the embodiment, the distortion decreases as the first protrusion 112p1 and the third protrusion 112p3 are further away from the central axis of the first group of lenses 114. Further, as the distance between the first guide hole hl and the first guide groove r1 increases, a lens decenter or tilt may be reduced.

Referring to FIG. 9, in an embodiment, the center 114C of the first lens group, the center of the first guide hole hl, and the center of the first guide groove r1 can be positioned on the same line. Through this, the first protrusion 112p1 and the third protrusion 112p3 may be designed to move away from the center of the first lens group 114. Accordingly, according to the embodiment, there is a special technical effect of reducing lens decenter or tilt by minimizing distortion of the lens.

Figure 10A:
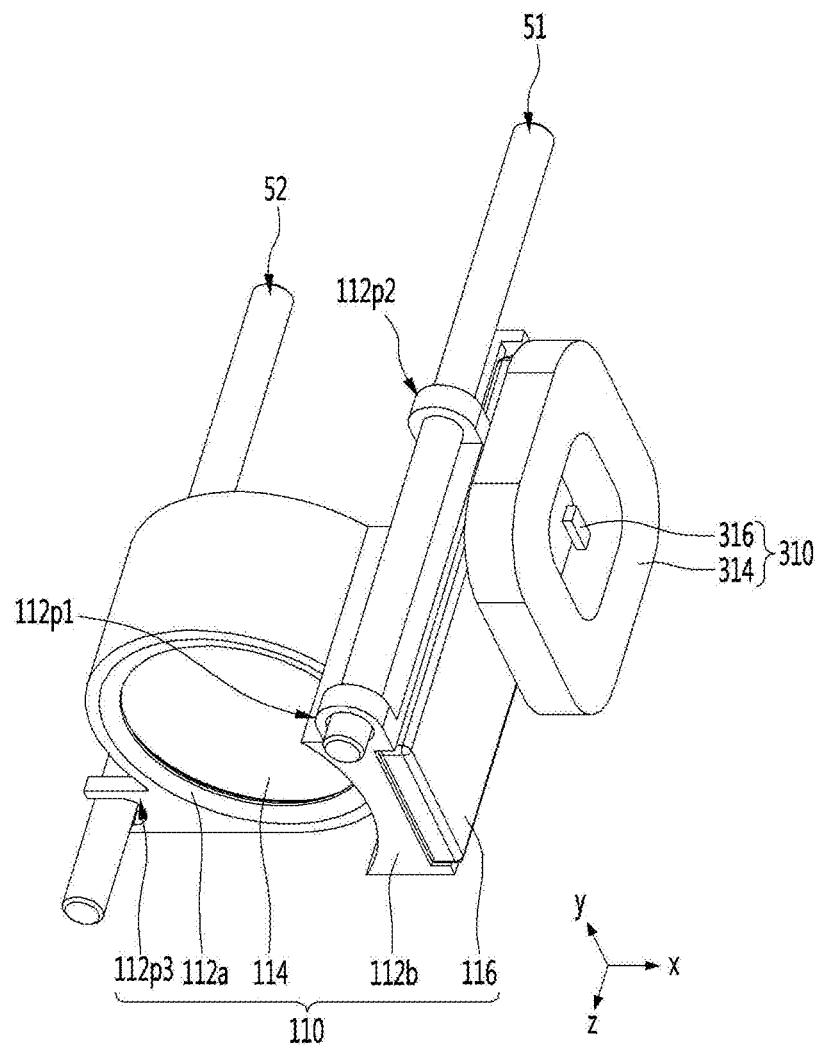
FIG. 10A is a partial perspective view of the camera actuator shown in FIGS. 4A and 4B.

Next, FIG. 10A is a partial perspective view of the camera driving apparatus shown in FIG. 4A.

In the lens actuator according to the embodiment, the first driving unit 310 may further include a first Hall sensor 316 inside the first coil unit 314.

For example, according to an embodiment, a compact camera module can be implemented by arranging the Hall sensor 316 in the inner area of the first coil unit 314 to reduce the area occupied by the Hall sensor.

According to the embodiment, there is a special technical feature that enables a compact camera module to be implemented by using the first driving magnet 116 in common without using a separate sensing magnet.

Accordingly, according to the embodiment, there is a technical effect that the zooming function can be smoothly performed even in a compact camera module.

Figure 10B:
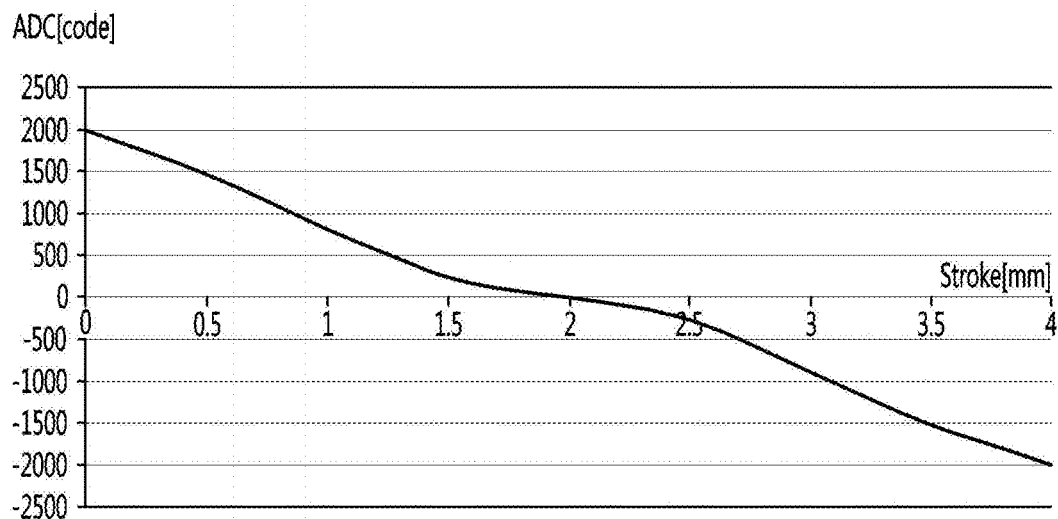
FIG. 10B is a graph showing Hall sensor linearity according to a stroke of the camera actuator shown in FIG. 10A.

Next, FIG. 10B is a graph showing Hall sensor linearity according to a stroke of the camera driving apparatus shown in FIG. 10A.

Referring to FIG. 10B, it can be seen that Hall Linearity is very excellent when the stroke of the lens assembly is about 4 mm in the camera module according to the implementation.

According to the embodiment, the Hall sensor 316 can be placed in the center of the first driving magnet 116, and through this, there is a special technique such as greatly improving the reliability of the position measurement of the lens with only one Hall sensor 316.

Figure 11:
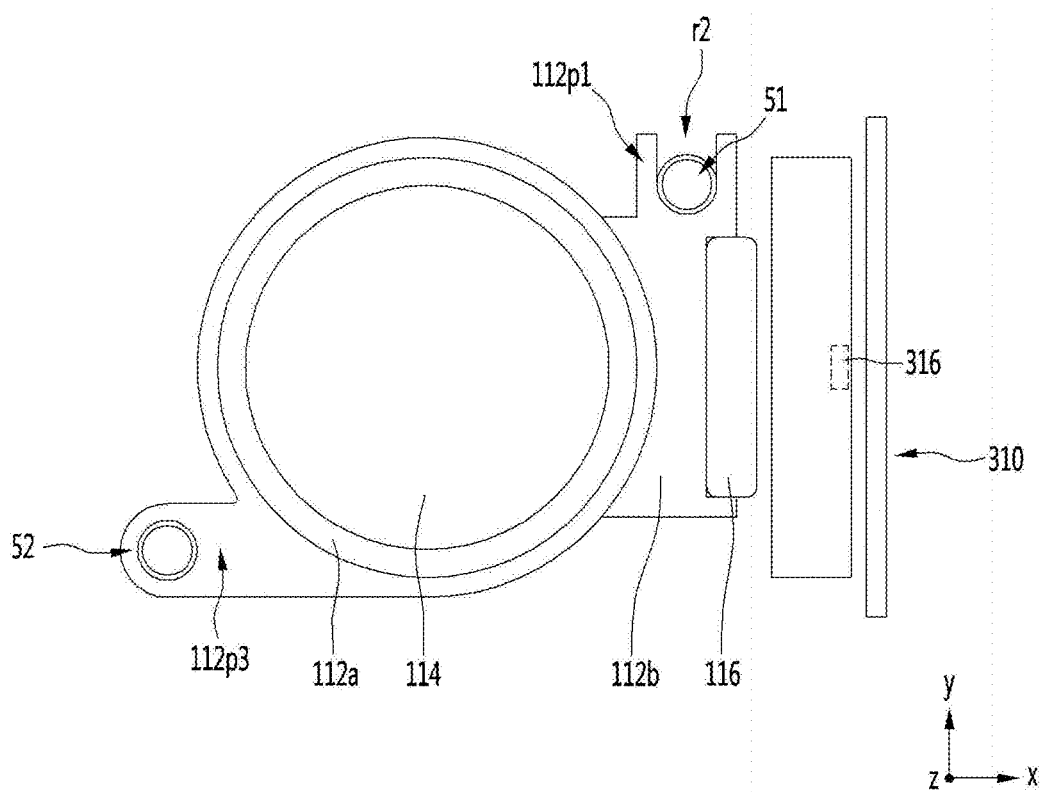
FIG. 11 is a front view of a camera driving apparatus according to a second embodiment.

FIG. 11 is a front view of a camera driving apparatus according to a second embodiment.

For example, FIG. 11 is another embodiment of the first lens assembly and the first driving unit shown in FIGS. 4A and 4B.

The second embodiment can adopt the technical features of the first embodiment, and the main features of the second embodiment will be described below.

Referring to FIG. 11, in the second embodiment, the first driving part housing 112b includes a first magnet 116 on one side, and a second guide groove r2 is provided in the first protrusion 112p1, a second guide hole (not shown) may be provided in the third protrusion 112p3.

Accordingly, the second guide hole may be disposed below the first magnet 116 and the second guide groove r2 may be disposed above the first magnet 116.

According to the second embodiment, the first protrusion 112p1 and the third protrusion 112p3 may be disposed opposite to each other based on the first group of lenses 114.

Accordingly, the second embodiment may also have the technical effects of the first embodiment described above. For example, the lens actuator and the camera module including the same according to the second embodiment have a technical effect of solving a problem of occurrence of a lens decenter or tilt during zooming.

For example, according to the second embodiment, by designing the camera module in consideration of the attraction according to the magnetic force between the first magnet 116 and the first yoke 312, the third protrusion 112p3 and the second pin 52 in the x-axis direction are designed to make point contact or line contact each other. Through this, the assembly tolerance between the third protrusion 112p3 and the second pin 52 can be controlled to be less than the limit level of the prior art. Accordingly, there is a technical effect of minimizing decenter or tilting of the lens during zooming by increasing the precision of lens alignment.

In addition, according to the second embodiment, the second guide groove r2 of the first protrusion 112p1 may be supported by the first pin 51, thereby inhibiting the lens unit from being distorted so that there is a technical effect that can solve the problem of the occurrence of lens tilt.

In addition, according to the second embodiment, there is a technical effect capable of solving the problem of generating friction torque during zooming.

For example, according to the second embodiment, the first magnet 116 and the first yoke 312 are designed in consideration of the attractive force according to the magnetic force between the first magnet 116 and the first yoke 312, so that the third protrusion 112p3 and the second pin 52 can point contact or line contact therebetween. Through this, according to the embodiment, there are technical effects such as improvement of driving force, reduction of power consumption, and improvement of control characteristics by minimizing friction torque.

In addition, according to the second embodiment, the weight of the first lens housing 112a is reduced by removing a region other than the third protrusion 112p3 from the lower region of the first lens housing 112a where the second pin 52 is located. By reducing the friction torque to reduce the frictional resistance, there are technical effects such as improvement of driving force during zooming, reduction of power consumption, and improvement of control characteristics.

Accordingly, according to the second embodiment, there is a complex technical effect that can significantly improve image quality or resolution by inhibiting the occurrence of decent or tilt of the lens while minimizing the friction torque during zooming.

In addition, referring to FIG. 11, in the second embodiment, the center of the first group of lenses 114, the center of the first guide hole, and the center of the second guide groove r2 are positioned on the same line. By designing the 112p3 and the first protrusion 112p1 away from the center of the first group of lenses 114, distortion of the lens can be minimized, thereby reducing lens decenter or tilt.

In addition, the second embodiment also has a technical effect of implementing a compact camera module by arranging the first Hall sensor 316 in the inner area of the first coil unit 314 to reduce the area occupied by the Hall sensor.

Figure 12:
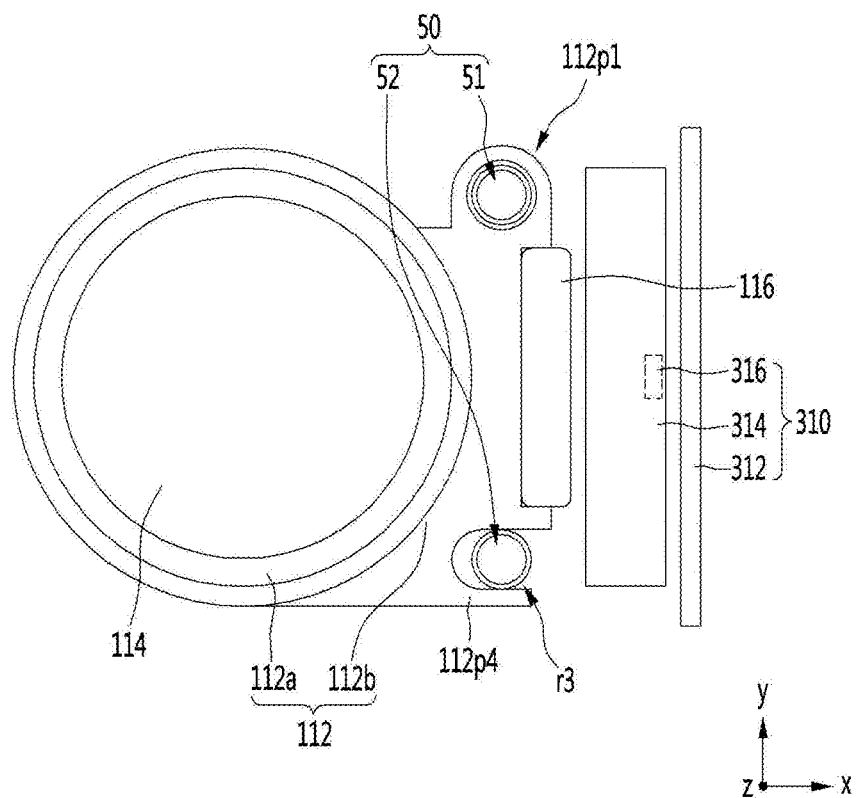
FIG. 12 is a front view of a camera driving apparatus according to a third embodiment.

Next, FIG. 12 is a front view of a camera driving apparatus according to a third embodiment.

For example, FIG. 12 is another embodiment of the first lens assembly and the first driving unit shown in FIG. 4A.

The third embodiment can adopt the technical features of the first embodiment or the second embodiment, and the main features of the third embodiment will be described below.

The lens actuator according to the third embodiment includes at least two pins 50 that are spaced apart from each other in parallel, and a first group of lenses 114, and a first housing that is moved along the pin 50 and a first driving unit 310 spaced apart from one side of the first housing 112, including the first coil unit 314 and the first yoke 312.

The pin 50 may include a first pin 51 and a second pin 52 disposed on the same side with respect to the first group of lenses 114.

The first housing 112 may include a first protrusion 112p1 and a fourth protrusion 112p4 disposed on the same side with respect to the first group of lenses 114.

In the first housing 112, a first guide hole hl may be disposed in the first protrusion 112p1, and a third guide groove r3 may be disposed in the fourth protrusion 112p4.

The first pin 51 and the second pin 52 may be coupled to the first guide hole hl and the third guide groove r3, respectively.

The first guide hole hl and the third guide groove r3 may be disposed so as to overlap between the top and bottom.

The third embodiment may also have the technical effects of the first and second embodiments described above. For example, the lens actuator and the camera module including the same according to the third embodiment have a technical effect of solving a problem of occurrence of a lens decenter or tilt during zooming.

For example, according to the third embodiment, by designing the camera module in consideration of the attraction according to the magnetic force between the first magnet 116 and the first yoke 312, it is possible to make point contact or line contact between the first protrusion 112p1 and the first pins 51. Through this, by controlling the assembly tolerance between the first protrusion 112p1 and the first pin 51 to be less than the limit level of the prior art. accordingly, there is a technical effect of increasing the precision of lens alignment and minimizing decenter or tilting of the lens during zooming.

In addition, according to the third embodiment, the third guide groove r3 of the fourth protrusion 112p4 may support the second pin 52. As a result, it is possible to inhibit the center of the lens unit from being distorted, and thus, there is a technical effect of solving the problem of the occurrence of lens tilt during zooming.

In addition, according to the third embodiment, there is a technical effect capable of solving the problem of generating friction torque during zooming.

For example, according to the third embodiment, the first protrusion 112p1 and the first pin 51 in the x-axis direction are designed in consideration of attractive force according to the magnetic force between the first magnet 116 and the first yoke 312. As the friction torque is minimized by making point contact or line contact between the first protrusion 112p1 and the first pin 51, there are technical effects such as improvement of driving force, reduction of power consumption, and improvement of control characteristics.

In addition, according to the third exemplary embodiment, regions other than the first protrusion 112p1 and the second protrusion 112p2 are removed from the upper region of the first driving part housing 112b where the first pin 51 is located. By reducing the weight of the driving part housing 112b, friction torque is reduced and frictional resistance is reduced, thereby improving driving force during zooming, reducing power consumption, and improving control characteristics.

Accordingly, according to the third embodiment, there is a complex technical effect that can significantly improve image quality or resolution by inhibiting the occurrence of decent or lens tilt of the lens while minimizing friction torque during zooming.

In addition, the third embodiment also has a technical effect of implementing a compact camera module by arranging the first Hall sensor 316 in the inner area of the first coil unit 314 to reduce the area occupied by the Hall sensor.

Figure 13:
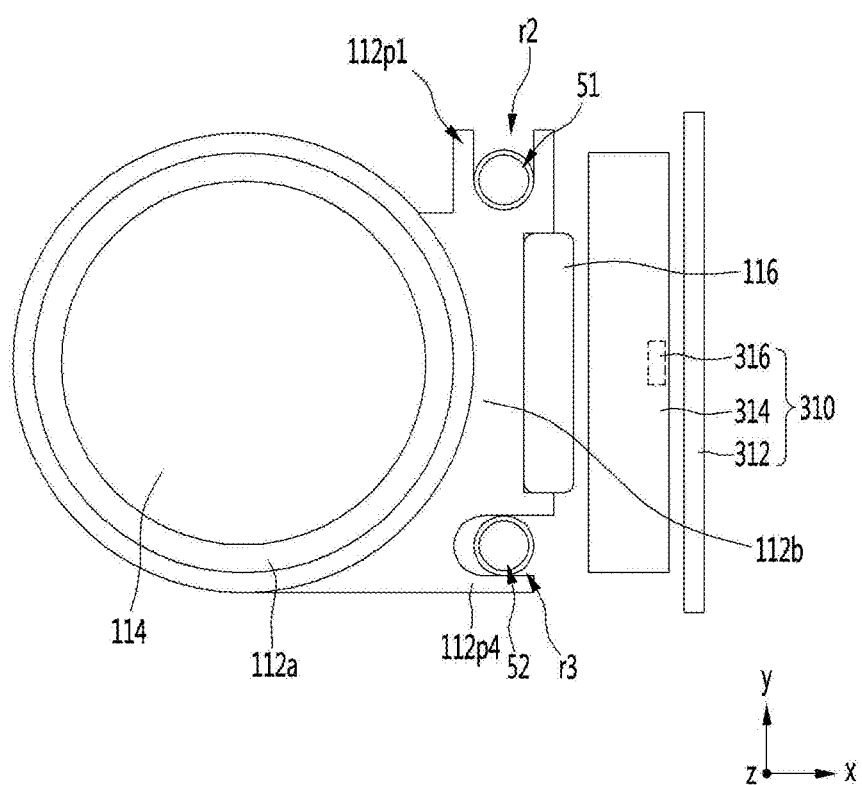
FIG. 13 is a front view of a camera driving apparatus according to a fourth embodiment.

Next, FIG. 13 is a front view of a camera driving apparatus according to a fourth embodiment.

For example, FIG. 13 is another embodiment of the first lens assembly and the first driving unit shown in FIG. 4A.

The fourth embodiment can adopt the technical features of the first to third embodiments, and the main features of the fourth embodiment will be described below.

In the fourth embodiment, the second guide groove r2 may be disposed in the first protrusions 112p1, and the third guide groove r3 may be disposed in the fourth protrusions 112p4.

The opening directions of the second guide groove r2 and the third guide groove r3 may be different from each other. For example, an open direction of the second guide groove r2 may be a y-axis direction, and an open direction of the third guide groove r3 may be an x-axis direction.

The second guide groove (r2) and the third guide groove (r3) may be disposed so as to overlap between the top and bottom.

The fourth embodiment may also have the technical effects of the first to third embodiments described above. For example, the lens actuator and the camera module including the same according to the fourth embodiment have a technical effect of solving a problem of occurrence of a lens decenter or tilt during zooming.

For example, according to the fourth embodiment, the camera module may be designed in consideration of the attractive force according to the magnetic force between the first magnet 116 and the first yoke 312. Through this, by making point contact or line contact between the first protrusion part 112p1 and the first pin 51 in the x-axis direction, the assembly tolerance between the first protrusion part 112p1 and the first pin 51 can be controlled below the limit level of the prior art. Accordingly, there is a technical effect of increasing the precision of lens alignment and minimizing decenter or tilting of the lens during zooming.

In addition, according to the fourth embodiment, since the third guide groove r3 of the fourth protrusion 112p4 supports the second pin 52, it is possible to inhibit the center of the lens from being distorted, so that the lens is tilted during zooming. There are technical effects that can solve the problem of occurrence In addition, according to the fourth embodiment, there is a technical effect that can solve the problem of generating friction torque during zooming.

For example, according to the fourth embodiment, the first protrusion 112p1 and the first pin 51 in the x-axis direction are designed in consideration of the attractive force according to the magnetic force between the first magnet 116 and the first yoke 312. As the friction torque is minimized by making point contact or line contact between the first protrusion 112p1 and the first pin 51, there are technical effects such as improvement of driving force, reduction of power consumption, and improvement of control characteristics.

In addition, according to the fourth exemplary embodiment, regions other than the first and second protrusions 112p1 and 112p2 are removed from the upper region of the first driving unit housing 112b where the first pin 51 is positioned. By reducing the weight of the driving part housing 112b, friction torque is reduced and frictional resistance is reduced, thereby improving driving force during zooming, reducing power consumption, and improving control characteristics.

Accordingly, according to the fourth embodiment, there is a complex technical effect that can significantly improve image quality or resolution by inhibiting the occurrence of decent or lens tilt of the lens while minimizing the friction torque during zooming.

In addition, the fourth embodiment also has a technical effect of implementing a compact camera module by arranging the first Hall sensor 316 in the inner region of the first coil unit 314 to reduce an area occupied by the Hall sensor.

Features, structures, effects, and the like described in the embodiments above are included in at least one embodiment, and are not necessarily limited to only one embodiment. Furthermore, the features, structures, effects, and the like illustrated in each embodiment may be combined or modified for other embodiments by a person having ordinary knowledge in the field to which the embodiments belong. Therefore, features related to such combinations and modifications should be interpreted as being included in the scope of the embodiments.

Although the embodiments have been described above, these are only examples and are not intended to limit the embodiments, and those of ordinary skill in the field to which the embodiments belong are not departing from the essential characteristics of the embodiments. It will be seen that branch transformation and application are possible. For example, each component specifically shown in the embodiment can be modified and implemented. And differences related to these modifications and applications should be construed as being included in the scope of the embodiments set in the appended claims.

INDUSTRIAL APPLICABILITY

The lens actuator according to the embodiment may be applied to a mobile terminal including a camera module. For example, the mobile terminal of the embodiment may include a camera module, a flash module, and an auto focus device provided on the rear side.

The camera module may include an image capturing function and an auto focus function. For example, the camera module may include an auto focus function using an image.

The camera module processes an image frame of a still image or video obtained by an image sensor in a photographing mode or a video call mode. The processed image frame may be displayed on a predetermined display unit and stored in a memory. A camera (not shown) may also be disposed in front of the mobile terminal body.

The invention claimed is:

1. A lens actuator comprising:
   a base;
   a pin coupled to the base;
   a housing including a group of lenses and configured to move along the pin in an optical axis direction; a magnet disposed on at least one side of the housing;
   a yoke disposed to be spaced apart from the magnet; and
   a coil disposed between the magnet and the yoke,
   wherein the housing includes a guide hole on one side thereof and a guide groove on an other side thereof, and the pin includes a first pin disposed in the guide hole and a second pin disposed in the guide groove,
   wherein an attractive force is applied between the yoke and the magnet, and
   wherein the housing includes a third protrusion protruding to a side, and the guide groove is disposed in the third protrusion.

2. The lens actuator of claim 1, wherein a part of the first pin is in contact with one side of the guide hole by the attractive force between the yoke and the magnet.

3. The lens actuator of claim 2, wherein the one side of the guide hole is in contact with the pin is an area adjacent to the group of lenses.

4. The lens actuator of claim 3, wherein the second pin is spaced apart from the bottom surface of the guide groove.

5. The lens actuator of claim 1, wherein the guide groove is opened in a direction parallel to a direction in which the attractive force acts.

6. The lens actuator of claim 1, wherein the guide groove is opened in a direction perpendicular to the magnet facing the coil.

7. The lens actuator of claim 1, wherein a height of the magnet is lower than that of the coil, and a length of the magnet is greater than that of the coil.

8. The lens actuator of claim 1, wherein an outer circumferential surface of the second pin is in contact with a side wall of the guide groove, and
   wherein a center of the group of lenses is located on a line connecting a center of the first pin and a center of the second pin.

9. A lens actuator comprising:
   a base;
   a pin coupled to the base;
   a housing including a group of lenses and configured to move along the pin in an optical axis direction;
   a magnet disposed on one side of the housing;
   a yoke disposed to be spaced apart from the magnet; and
   a coil disposed between the magnet and the yoke,
   wherein the housing includes a first guide groove on one side thereof and a second guide groove on an other side thereof,
   wherein the pin includes a first pin disposed in the first guide groove and a second pin disposed in the second guide groove,
   wherein an attractive force is applied between the yoke and the magnet, and
   wherein the housing includes a fourth protrusion protruding to a side, and a third guide groove is disposed in the fourth protrusion.

10. The lens actuator of claim 9, wherein each of the first guide groove and the second guide groove includes an open area in different directions.

11. The lens actuator of claim 1, wherein the housing includes a first protrusion protruding upward, and the guide hole is disposed in the first protrusion.

12. The lens actuator of claim 11, wherein the housing includes a second protrusion protruding upward and spaced apart from the first protrusion and the guide hole is disposed in the second protrusion.

13. The lens actuator of claim 12, wherein a first distance between the first protrusion and the second protrusion is greater than a width of the group of lenses in the optical axis direction.

14. The lens actuator of claim 1, wherein the housing includes a first protrusion protruding upward, and a second protrusion protruding upward and spaced apart from the first protrusion, and the first guide groove is disposed in the first protrusion and the second protrusion.

15. The lens actuator of claim 14, wherein a first distance between the first protrusion and the second protrusion is greater than a width of the group of lenses in the optical axis direction.

16. The lens actuator of claim 9, wherein the first guide groove and the third guide groove vertically overlap each other.

17. The lens actuator of claim 1, wherein a center of the group of lenses is located on a line connecting a center of the first pin and a center of the second pin disposed in the guide groove of the third protrusion.

* * * * *